US011766816B2

United States Patent
Asanuma (10) Patent No.: US 11,766,816 B2
(45) Date of Patent: Sep. 26, 2023

(54) MOLDED ARTICLE MANUFACTURING METHOD, MOLDED ARTICLE, AND MOLDED ARTICLE MANUFACTURING APPARATUS

(71) Applicant: Toshiba Kikai Kabushiki Kaisha, Tokyo-to (JP)

(72) Inventor: Nobuyuki Asanuma, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 123 days.

(21) Appl. No.: 17/021,650

(22) Filed: Sep. 15, 2020

(65) Prior Publication Data

US 2020/0406516 A1    Dec. 31, 2020

Related U.S. Application Data

(62) Division of application No. 15/520,314, filed as application No. PCT/JP2015/073661 on Aug. 24, 2015, now Pat. No. 10,807,285.

(30) Foreign Application Priority Data

Oct. 20, 2014    (JP) ................................. 2014-213610

(51) Int. Cl.
*B29C 45/64*    (2006.01)
*B29C 45/14*    (2006.01)
(Continued)

(52) U.S. Cl.
CPC .... *B29C 45/1418* (2013.01); *B29C 45/14008* (2013.01); *B29C 45/14336* (2013.01);
(Continued)

(58) Field of Classification Search
CPC .................................................. B29K 2501/12
See application file for complete search history.

(56) References Cited

U.S. PATENT DOCUMENTS 3,861,955 A * 1/1975 Lemelson ............... B29D 22/04
428/206
4,075,266 A * 2/1978 Theysohn ......... B29C 45/14262
264/250
(Continued)

FOREIGN PATENT DOCUMENTS

| CN | 101804682 | 8/2010 |
| CN | 103562054 | 2/2014 |

(Continued)

OTHER PUBLICATIONS

Chinese Office Action (with English Translation) issued in CN Application No. 201580057066.7 dated Aug. 16, 2018.
(Continued)

*Primary Examiner* — Yung-Sheng M Tsui
(74) *Attorney, Agent, or Firm* — DLA PIPER LLP US (57) ABSTRACT

An insert member (100) heated by a heating device (13) is conveyed, by means of a conveyance device (12), into a mold (51). Next, shaping is performed on the insert member (100) inside the mold (51), with the mold (51) being open by a minute distance. A molding material (91) is injected into the mold (51) and pressed while closing the mold (51) which has been open by the minute distance to thereby mold a molded article (80) including the insert member (100).

5 Claims, 5 Drawing Sheets

(51) Int. Cl.
*B29C 45/72* (2006.01)
*B29K 501/12* (2006.01)

(52) U.S. Cl.
CPC ........ *B29C 45/14786* (2013.01); *B29C 45/64* (2013.01); *B29C 45/7207* (2013.01); *B29C 2045/14286* (2013.01); *B29C 2045/14295* (2013.01); *B29K 2501/12* (2013.01)

(56) References Cited

U.S. PATENT DOCUMENTS

| | | |
|---|---|---|
| 6,524,511 B1 | 2/2003 | Ueki et al. |
| 6,673,296 B2 | 1/2004 | Hiraiwa et al. |
| 2005/0017391 A1 * | 1/2005 | Kobayashi ............ B29C 43/183 264/319 |

FOREIGN PATENT DOCUMENTS

| | | | | |
|---|---|---|---|---|
| DE | 198 43 921 | | 3/2000 | |
| DE | 10 2010 052 180 | | 5/2012 | |
| DE | 102010052180 A1 * | | 5/2012 | ......... B29C 33/0055 |
| EP | 0 730 947 | | 9/1996 | |
| JP | 55-117627 | | 9/1980 | |
| JP | H05-329884 | | 12/1993 | |
| JP | 11-316814 | | 11/1999 | |
| JP | 2001-284959 | | 10/2001 | |
| JP | 2010-187902 | | 9/2010 | |
| JP | 2013-067135 | | 4/2013 | |
| JP | 2014-097662 | | 5/2014 | |
| WO | WO 2014-098194 | | 6/2014 | |

OTHER PUBLICATIONS

Office Action in German Patent Application 112015004771.9 dated Feb. 11, 2019.
International Search Report (with English Translation) issued in PCT/JP2015/073661 dated Sep. 29, 2015.
Written Opinion issued in PCT/JP2015/073661 dated Sep. 29, 2015.
English Language Abstract of JP 2014-097662 published May 29, 2014.
English Language Abstract of JP 55-117627 published Sep. 10, 1980.
English Language Abstract of JP 2001-284959 published Oct. 12, 2001.
English Language Abstract of JP 2013-067135 published Apr. 18, 2013.
Japanese Office Action (with English Translation) issued in JP Application No. 2014-213610 dated May 23, 2017.
English Language Abstract of JP 11-316814 published Nov. 16, 1999.
English Language Abstract of JP 2010-187902 published Sep. 2, 2010.
German Office Action in DE Application No. 112015004771.9 dated Jan. 7, 2020.
Indian Office Action in IN Application No. 201717014054 dated Dec. 19, 2019.

* cited by examiner

MOLDED ARTICLE MANUFACTURING METHOD, MOLDED ARTICLE, AND MOLDED ARTICLE MANUFACTURING APPARATUS

CROSS REFERENCE TO RELATED APPLICATIONS

This application is a U.S. Divisional of U.S. application Ser. No. 15/520,314 filed Apr. 19, 2017, which is a U.S. National Stage Application of International Application No. PCT/JP2015/073661 filed Aug. 24, 2015, which claims priority from Japanese Patent Application No. 2014-213610 filed Oct. 20, 2014. The entirety of all the above-listed applications are incorporated herein by reference.

TECHNICAL FIELD

The present invention relates to a molded article manufacturing method, a molded article manufactured by such a molded article manufacturing method, and a molded article manufacturing apparatus.

BACKGROUND ART

Conventionally, there has been known a technique in which a sheet-like material heated by a heating device to be softened state is inserted into a mold mounted on a mold clamping device of a molding apparatus and is shaped therein before injection molding is performed (see, for example, Patent Document 1).

Further, conventionally, there has been known a technique in which a previously shaped preliminary molding is inserted into a mold mounted on a mold clamping device of a molding apparatus before there is performed injection molding through compression molding or core back injection molding using a movable core to cover the entire surface of the previously shaped preliminary molding with a resin layer (see, for example, Patent Documents 2 and 3).

PRIOR ART DOCUMENT

Patent Documents

Patent Document 1: PCT Patent Publication No. WO2014/098194
Patent Document 2: JP-A-2013-067135
Patent Document 3: JP-A-2001-284959

SUMMARY OF THE INVENTION

In the technique of Patent Document 1, however, there exists in the mold a space allowing the charging of the resin material, so that, in some cases, even if shaping is performed, it is rather difficult to shape a prepreg (insert member) into a desired configuration. In such cases, if the injection molding is performed after the shaping, a twisted portion is likely to be generated in the prepreg, resulting in a fear of difficulty in forming a uniform resin layer. In the technique of Patent Documents 2 and 3, it is necessary to previously shape the prepreg by machining it into the preliminary molding, so that there is a problem that the manufacturing of the molded article takes time.

The present invention has been made in view of the above problems. It is an object of the present invention to provide a molded article manufacturing method, a molded article, and a molded article manufacturing apparatus allowing suppression of deterioration in the strength and in the outward appearance of the molded article due to twisting, displacement, peeling, etc. of the prepreg (insert member) and making it possible to achieve an improvement in terms of the productivity of the molded article.

DISCLOSURE OF THE INVENTION

According to the present invention, there is provided a molded article manufacturing method including: conveying, by means of a conveyance device, an insert member, heated by a heating device, into a mold; shaping the insert member inside the mold, with the mold being open by a minute distance; and injecting a molding material into the mold and pressing while closing the mold which has been open by the minute distance to thereby mold a molded article including the insert member.

According to the present invention, there is provided a molded article manufacturing method including: conveying, by means of a conveyance device, an insert member, heated by a heating device, into a mold; shaping the insert member inside the mold; and opening the mold to a minute degree afterwards and injecting a molding material into the mold to thereby mold a molded article including the insert member.

According to the present invention, there is provided a molded article manufactured by the molded article manufacturing method described above.

According to the present invention, there is provided a molded article manufacturing apparatus including: a heating device to heat an insert member; a conveyance device to convey the insert member; an opening/closing device on which a mold is mounted; and an injection device to inject a molding material into the mold, wherein the opening/closing device includes a first driving portion configured to shape the insert member inside the mold by moving one half of the mold mounted on the opening/closing device, and a second driving portion moving said one half of the mold by a minute distance.

According to the present invention, it is possible to suppress deterioration in the strength of the molded article and in the outward appearance thereof due to twisting, displacement, peeling, etc. of the insert member, and to achieve an improvement in terms of the productivity of the molded article.

MODE FOR CARRYING OUT THE INVENTION

In the following, an embodiment of the present invention will be described with reference to FIGS. 1 through 3. FIGS.

1 through 3 are diagrams illustrating an embodiment of the present invention. In the following diagrams, the same components are indicated by the same reference symbols, and a detailed description thereof may be partially left out.

(Construction of Molded Article Manufacturing Apparatus)

First, the construction of the molded article manufacturing apparatus for executing the molded article manufacturing method according to the present embodiment will be described with reference to FIG. 1. FIG. 1 is a perspective view of the molded article manufacturing apparatus.

Figure 1:
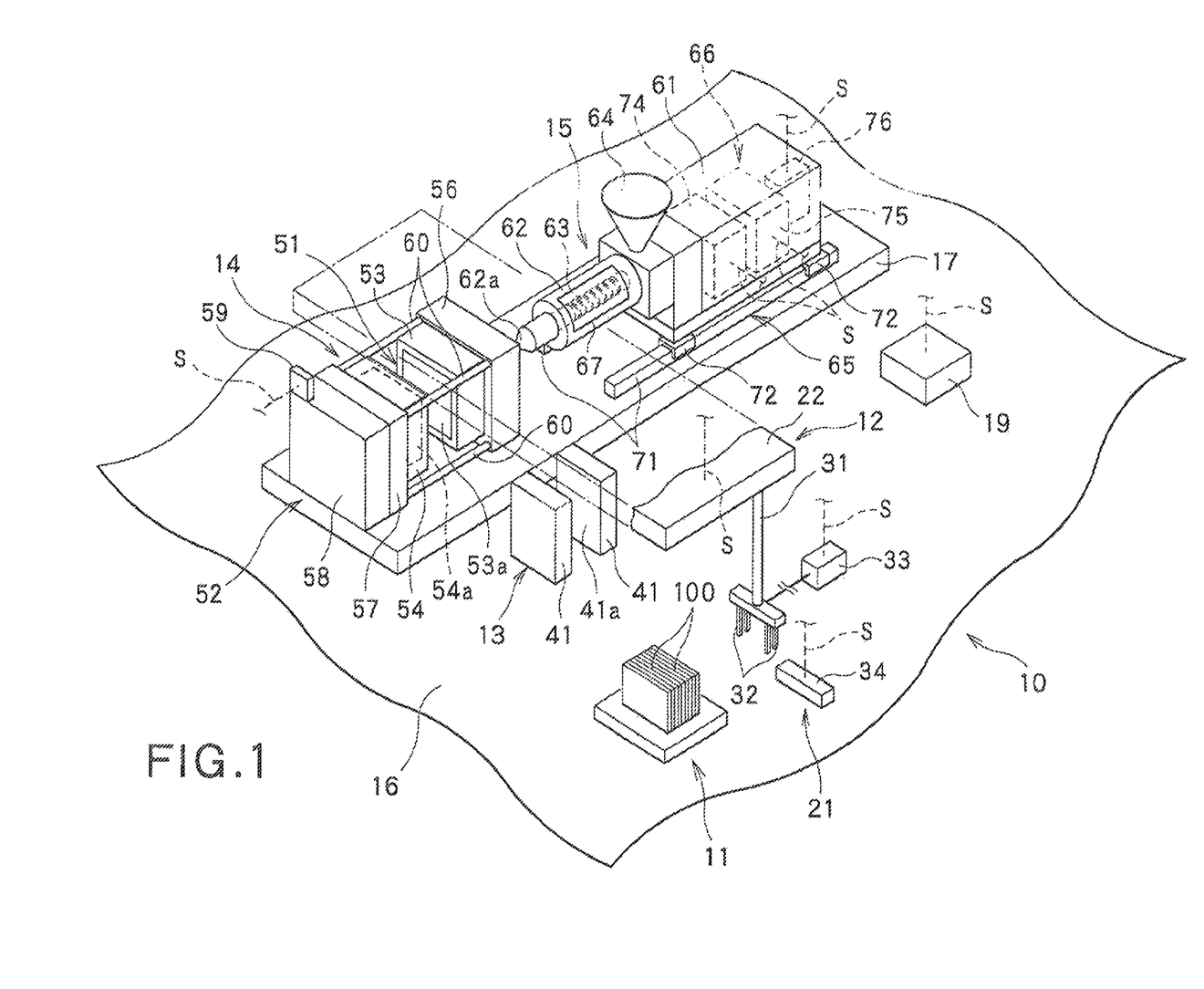
FIG. 1 is a perspective view of a molded article manufacturing apparatus for executing a molded article manufacturing method according to an embodiment of the present invention.

As shown in FIG. 1, a molded article manufacturing apparatus 10 comprises, for example, a storage portion 11, a conveyance device 12, a heating device 13, a mold device 14, an injection device 15, and a control device 19. The molded article manufacturing apparatus 10 is arranged in a laying range 16 in a plant or the like, and the mold device 14 and the injection device 15 are arranged on a base 17. The molded article manufacturing apparatus 10 heats a thermoplastic prepreg (insert member, prepreg, reinforcing member, or reinforcing material) 100, and then shapes it by the mold device 14 after heating it, and, further, performs injection molding thereon by the injection device 15, whereby a molded article 80 (described below) is manufactured.

The thermoplastic prepreg 100 is formed as a sheet. While in FIG. 1 the thermoplastic prepreg 100 exhibits a square configuration in plan view, the thermoplastic prepreg 100 is formed in a configuration suited for the shaping of the molded article 80. For example, the thermoplastic prepreg 100 may be formed in a square, a triangular, or an elliptical configuration, or in a configuration allowing the formation of the molded article 80.

The storage portion 11 stores a plurality of thermoplastic prepregs 100. For example, the storage portion 11 may store the thermoplastic prepregs 100 in a vertical attitude. The storage portion 11 may, for example, store the thermoplastic prepregs 100 in a horizontal attitude, and allow a change from the horizontal to the vertical attitude.

Here, the vertical attitude of the thermoplastic prepregs 100 (vertical attitude) is an attitude in which the main surfaces of the thermoplastic prepregs 100 extend substantially in the gravitational direction, that is, in the vertical direction, or an attitude equivalent to these attitudes. The horizontal attitude of the thermoplastic prepregs 100 (horizontal attitude) is an attitude in which the main surfaces of the thermoplastic prepregs 100 extend substantially in the horizontal direction, that is, along the installation surface of the molded article manufacturing apparatus 10, or an attitude equivalent to these attitudes.

The conveyance device 12 can convey the thermoplastic prepregs 100 in the vertical attitude successively from the storage portion 11 of the thermoplastic prepreg 100 to the heating device 13 and to the mold device 14. More specifically, the conveyance device 12 comprises, for example, a chuck device 21 and a conveyance mechanism 22.

The chuck device 21 comprises, for example, a support portion 31 provided on the conveyance mechanism 22, a plurality of chucks 32, opening/closing means 33 for opening and closing the chucks 32, and a cooling device 34. The chuck device 21 pinches the thermoplastic prepreg 100 at a plurality of positions by the plurality of chucks 32.

The support portion 31 supports the plurality of chucks 32. The support portion 31 can be moved by the conveyance mechanism 22. The chucks 32 are driven by the opening/closing means 33, whereby the distal ends thereof can be opened and closed. The chucks 32 may be formed so as to be reduced in the width of the distal ends thereof so that the chucks 32 can hold at least the thermoplastic prepreg 100.

The opening/closing means 33 is a drive source for opening and closing the chucks 32, and a pneumatic cylinder or the like is used as the opening/closing means 33. The opening/closing means 33 is electrically connected to the control device 19 via a signal line S.

The cooling device 34 serves to cool the chucks 32. The cooling device 34 cools the chucks 32, for example, by ejecting air against the chucks 32. The cooling device 34 is electrically connected to the control device 19 via the signal line S.

The cooling device 34 can cool at least the parts of the chucks 32 coming into contact with the thermoplastic prepreg 100 and the portions around the parts. The cooling device 34 is supported by the support portion 31, or is arranged at a position where the cooling device 34 can cool the chucks 32 in a pre-process in which the chucks 32 move to the storage portion 11. The cooling device 34 may be situated above the heating device 13, effecting cooling so as not to affect the thermoplastic prepreg 100 even during the heating of the thermoplastic prepreg 100.

The conveyance mechanism 22 is a mechanism conveying the chucks 32 of the chuck device 21 successively to the storage portion 11, the heating device 13, and the mold device 14. For example, the conveyance mechanism 22 may cause the support portion 31 to move through sliding. The conveyance mechanism 22 is a rail, for example. The conveyance mechanism 22 may be an articulated robot or the like. The conveyance mechanism 22 is electrically connected to the control device 19 via the signal line S.

As shown in FIG. 1, the heating device 13 comprise, for example, a pair of heating portions 41 which can heat the thermoplastic prepreg 100 and which are opposite each other at an interval, and a support portion (not shown) supporting the heating portions 41. The pair of heating portions 41 are arranged, for example, such that heating surfaces 41a heating the thermoplastic prepreg 100 extend along the main surfaces of the thermoplastic prepreg 100.

That is, the pair of heating portions 41 are arranged, for example, in the vertical attitude (e.g., as rectangular parallelepipeds substantially vertically elongated along the gravitational direction) like the thermoplastic prepreg 100. The pair of heating portions 41 are opposite each other at an interval allowing passage of a part of the distal ends of the chucks 32 and the thermoplastic prepreg 100 held by the chucks 32.

Each of the opposing heating surfaces 41a of the heating portions 41 is provided, for example, with a single or a plurality of infrared heaters. As a result, the heating portions 41 heat, to a predetermined temperature, the thermoplastic prepreg 100 passing between the heating portions 41 or stopping between the heating portions 41. Here, the predetermined temperature is a temperature allowing, for example, the shaping of the thermoplastic prepreg 100 in the mold device 14.

The mold device 14 comprises a mold 51 that can be opened and closed and a mold clamping device 52 that opens and closes the mold 51.

The mold 51 comprises, for example, a stationary die 53 (the other half of the mold or one half of the mold) and a movable die 54 (one half of the mold or the other half of the mold). The movable die 54 is movable with respect to the stationary die 53. The surface of the stationary die 53 facing the movable die 54 has a cavity 53a, and the surface of the movable die 54 facing the stationary die 53 has a cavity 54a. In the closed state, the mold 51 defines a space corresponding to the configuration of the molded article 80 by the cavity 53*a* of the stationary die 53 and the cavity 54*a* of the movable die 54. The mold 51 is mounted on the mold clamping device 52.

The mold clamping device (opening/closing device) 52 is formed so as to be capable, for example, of opening and closing the mold 51 and of mold-clamping the mold 51. The mold clamping device 52 comprises, for example, a stationary platen 56, a movable platen 57 movable with respect to the stationary platen 56, a toggle mechanism 58 moving the movable platen 57, a drive source 59 driving the toggle mechanism 58, and a plurality of tie bars 60 guiding the movement of the movable platen 57 with respect to the stationary platen 56. The mold clamping device 52 is an example of the molding device.

The stationary platen 56 supports the stationary die 53, and the movable platen 57 supports the movable die 54. The toggle mechanism 58 is driven by the drive source 59 to thereby cause the movable platen 57 to advance and retreat with respect to the stationary platen 56. The drive source 59 serves to drive the toggle mechanism 58. The drive source 59 is electrically connected to the control device 19 via the signal line S. The plurality of tie bars 60 guide the movable platen 57 so as to cause it to linearly advance and retreat with respect to the stationary platen 56. The tie bars 60 are provided, for example, at four positions so as to bridge between the stationary platen 56 and the toggle mechanism 58.

The injection device 15 comprises, for example, a housing 61, a cylinder 62, a screw 63, a hopper 64, moving means 65, a driving device 66, and a cylinder heating device 67. The injection device 15 injects a resin material (molding material) into the mold 51 of the mold device 14 to thereby mold the molded article 80 together with the mold clamping device 52. Further, the injection device 15 is formed together with the mold clamping device 52, whereby the injection device 15 constitutes an example of the molding device (injection molding device).

The housing 61 supports, for example, the cylinder 62, the screw 63, and the hopper 64, and accommodates the driving device 66 therein. The cylinder 62 accommodates the screw 63 therein. The cylinder 62 comprises an injection nozzle 62*a* provided at the distal end thereof. The injection nozzle 62*a* can be connected to a gate 51*a* (see FIGS. 3A through 3C) formed in the mold 51. The screw 63 is rotatable within the cylinder 62, and can advance and retreat with respect to the cylinder 62.

The hopper 64 accommodates a molten resin material (material) for performing injection molding. The hopper 64 is configured to supply the resin material accommodated therein into the cylinder 62.

The moving means 65 is arranged, for example, on the base 17, and comprises a plurality of rails 71 extending toward the stationary die 53 and the stationary platen 56, and a plurality of guides 72 provided under the housing 61 and capable of moving on the rails 71 through sliding. The guides 72 are guided by the rails 71, whereby the moving means 65 causes the housing 61 and the respective components supported by the housing 61 to advance and retreat with respect to the mold device 14 along the rails 71.

The driving device 66 comprises, for example, a first driving device 74 rotating the screw 63, a second driving device 75 causing the screw 63 to advance and retreat with respect to the cylinder 62, and a third driving device 76 causing the housing 61 to advance and retreat with respect to the mold device 14 along the rails 71.

By rotating the screw 63, the first driving device 74 performs quantitative supply of the resin material supplied from the hopper 64. The first driving device 74, the second driving device 75, and the third driving device 76 are electrically connected to the control device 19 via the signal line S.

The cylinder heating device 67 serves to heat the cylinder 62. The cylinder heating device 67 is attached to the cylinder 62. By heating the cylinder 62, the cylinder heating device 67 melts the resin material supplied from the hopper 64. The cylinder heating device 67 is electrically connected to the control device 19 via the signal line S.

The control device 19 controls the conveyance device 12, the mold device 14, and the injection device 15. More specifically, by controlling the conveyance mechanism 22, the control device 19 controls the moving operation of the chucks 32 (the support portion 31). Further, the control device 19 detects the position of the support portion 31 of the conveyance device 12.

By controlling the opening/closing means 33, the control device 19 controls the opening/closing operation of the chucks 32. By controlling the cooling device 34, the control device 19 controls the cooling of the chucks 32.

By controlling the drive source 59, the control device 19 drives the toggle mechanism 58, and controls the advancing/retreating movement of the movable die 54 (the movable platen 57). By controlling the first driving device 74, the second driving device 75, and the third driving device 76, the control device controls the rotational movement and advancing/retreating movement of the screw 63, and the advancing/retreating movement of the housing 61 (the advancing/retreating movement of the injection device 15). By controlling the cylinder heating device 67, the control device 19 controls the heating operation for the cylinder 62.

Next, the construction of the molded article 80 manufactured by the above-described molded article manufacturing apparatus 10 will be described with reference to FIG. 2.

Figure 2:
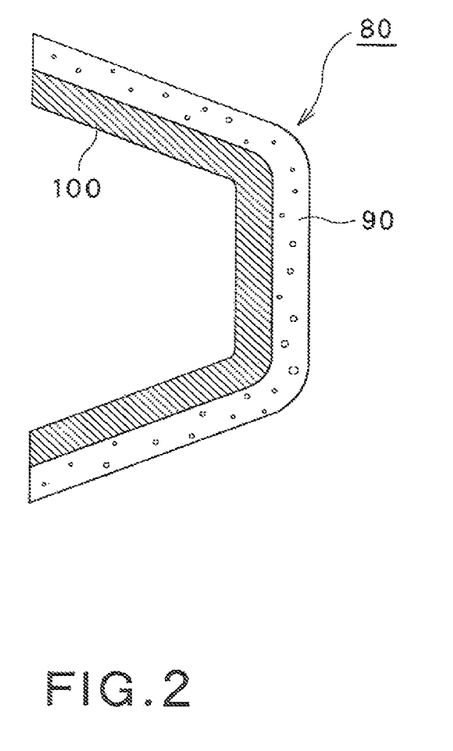
FIG. 2 is a schematic sectional view of a molded article according to the embodiment of the present invention.

As shown in FIG. 2, the molded article 80 is a member being used a fiber reinforced plastic such as carbon fiber reinforced plastic (CFRP) or glass fiber reinforced plastic (GFRP), and includes a resin portion (material portion) 90 containing the resin material (material), and a thermoplastic prepreg (insert member, prepreg, reinforcing member, or reinforcing material) 100 integrated with the resin portion 90. The thermoplastic prepreg 100 is integrated with the resin portion 90 while bent and held in close contact with the resin portion 90.

Examples of the resin material (material or molding material) constituting the resin portion 90 include epoxy type resin, polyamide type resin, and phenol type resin. Further, examples of the thermoplastic prepreg 100 include a sheet obtained by impregnating continuous fiber such as carbon fiber, glass fiber, or aramid fiber, or filaments with a thermoplastic resin material.

Due to the insertion of the thermoplastic prepreg 100, the molded article 80 can provide a mechanical strength equal to or higher than that attained by a molded article formed of resin alone. Such a molded article 80 may be used, for example, as an automotive component, aircraft component, building component, or industrial machinery component.

(Molded Article Manufacturing Method)

Next, a method of manufacturing the molded article 80 shown in FIG. 2 by using the molded article manufacturing apparatus 10 shown in FIG. 1 (the molded article manufacturing method according to the present embodiment) will be described.

First, the control device 19 moves the chucks 32 to the storage portion 11, and places the chucks 32 in the open state. In the case where the thermoplastic prepreg 100 is conveyed to the heating device 13 before this cycle, the chucks 32 may be cooled by the cooling device 34.

Next, the chucks 32 are further moved, and the distal ends of the chucks 32 are situated at the peripheral edge (edge portion or end portion) of the thermoplastic prepreg 100. Next, the chucks 32 are placed in the closed state, and the thermoplastic prepreg 100 is held by the chucks 32.

Next, the chucks 32 are moved to move the thermoplastic prepreg 100 to the position between the pair of heating portions 41, and the thermoplastic prepreg 100 is heated to a predetermined temperature. Next, the chucks 32 are moved to convey the thermoplastic prepreg 100 to the mold 51 (the mold clamping device 52 on which the mold 51 is mounted), and the thermoplastic prepreg 100 is arranged in (or inserted into) the mold 51 (the mold clamping device 52). At this time, for example, by fixing the thermoplastic prepreg 100 to a positioning pin (not shown) provided on the stationary die 53 or the movable die 54, positioning may be effected on the thermoplastic prepreg 100. The thermoplastic prepreg 100 is placed in a softened state by passing between the pair of heating portions 41 of the heating device 13 or stopping between the pair of heating portions 41 of the heating device 13.

Next, the control device 19 controls the drive source 59, whereby the toggle mechanism 58 is driven; as a result, the movable die 54 moves toward the stationary die 53 to effect mold clamping. After this, a resin material (molding material or material) 91 is injected into the mold 51, whereby the molded article 80, including the thermoplastic prepreg 100, is molded.

Figure 3A:
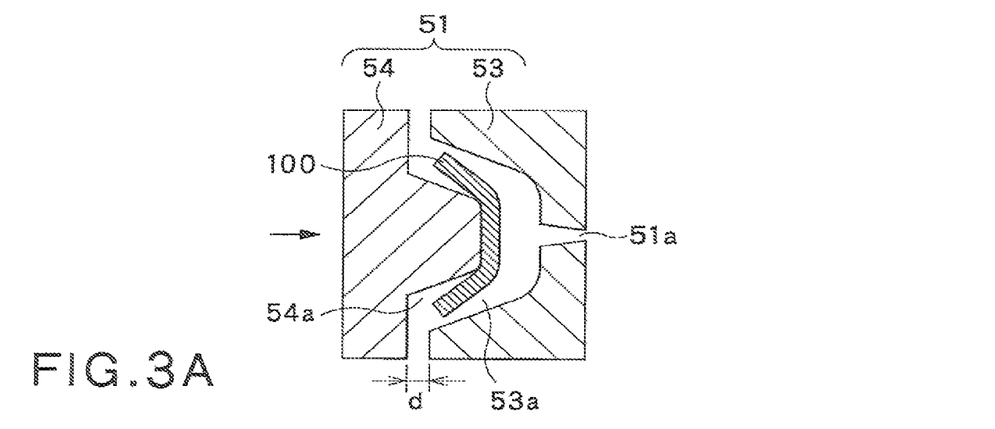
FIGS. 3A through 3C are schematic sectional views illustrating a molded article manufacturing method according to the embodiment of the present invention.

In this while, as shown in FIG. 3A, the movable die 54 is first moved toward the stationary die 53, and the movable die 54 is stopped slightly before the closing limit of the mold 51. More specifically, the movable die 54 is stopped at a position where a distance d between the movable die 54 and the stationary die 53 is, for example, approximately 0.5 to 3 mm. In this case, the heated thermoplastic prepreg 100 is pressed within the mold 51 by the mold 51 (the mold clamping device 52 on which the mold 51 is mounted), and undergoes shaping in conformity with the configuration of the cavities 53a and 54a.

Figure 3B:
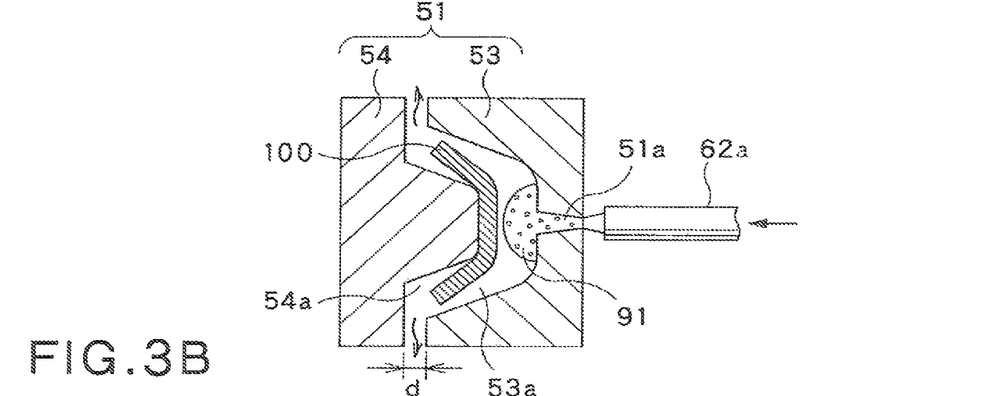
Figure 3C:
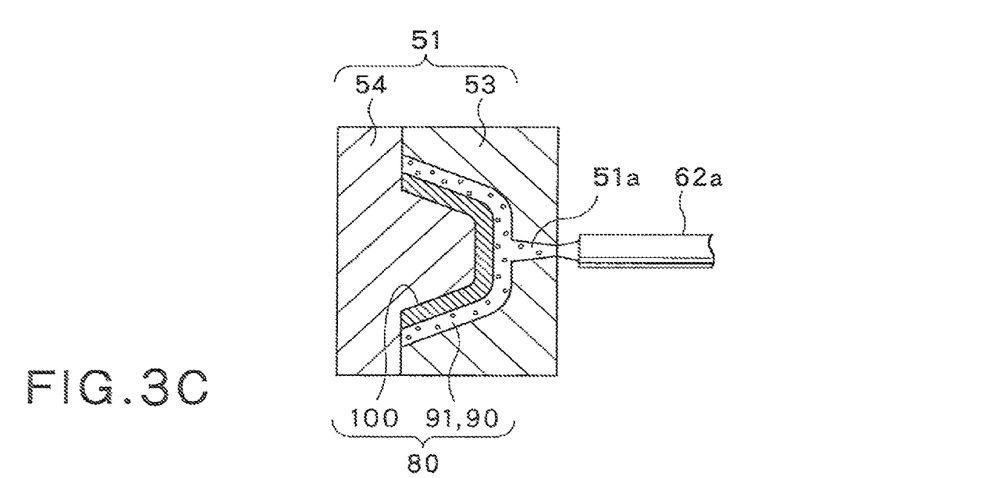

Next, as shown in FIG. 3B, the housing 61 (see FIG. 1) is moved, and the injection nozzle 62a is connected to the gate 51a formed in the stationary die 53. Subsequently, the resin material 91 supplied into the cylinder 62 from the hopper 64 and melted is injected via the gate 51a of the mold 51. As a result, the resin material 91 is injected into the cavities 53a and 54a, and the molten resin material 91 fills the cavities 53a and 54a in conformity with the configuration thereof.

In this process, the air that has existed beforehand within the cavities 53a and 54a is forced out by the resin material 91 to be thereby allowed to escape to the exterior via the gap between the movable die 54 and the stationary die 53. In this way, the air is allowed to escape via the gap between the movable die 54 and the stationary die 53, whereby the molten resin material 91 flows in a substantially fixed direction, and there is no fear of the resin material 91 flowing in a complicated manner within the cavities 53a and 54a. As a result, it is possible to prevent the thermoplastic prepreg 100 from being disturbed by the movement of the molten resin material 91, thus preventing generation of twisting, displacement, peeling, etc. in the thermoplastic prepreg 100.

Subsequently, after the resin material 91 has spread all over the cavities 53a and 54a, or before the resin material 91 has completely spread throughout the cavities 53a and 54a, the drive source 59 is controlled to drive the toggle mechanism 58, causing the movable die 54 to advance toward the stationary die 53 side again. As a result, as shown in FIG. 3C, the movable die 54 reaches the closing limit of the mold 51, and the movable die 54 and the stationary die 53 are brought into close contact with each other. At this time, the resin material 91 and the thermoplastic prepreg 100 are pressed by the movable die 54 and the stationary die 53. As a result, the resin material 91 and the thermoplastic prepreg 100 are shaped into the configuration of the cavities 53a and 54a, and the resin material 91 and the thermoplastic prepreg 100 are integrated with each other.

Next, the thermoplastic prepreg 100 and the resin material 91 that have been shaped are cooled within the mold 51, whereby the molded article 80, including a resin portion 90 corresponding to the resin material 91 and the thermoplastic prepreg 100 integrated with the resin portion 90, is molded. Further, at the injection device 15, a measuring operation is performed to measure the amount of the resin material 91. Next, the movable die 54 is moved to place the mold 51 in the open state, and the molded article 80 is extracted from the mold 51 thanks to a protruding pin (not shown) provided on the stationary die 53 or the movable die 54.

From this onward, similar processes are repeated. Through the repetition of these processes, a plurality of molded articles 80 are manufactured successively.

As described above, according to the present embodiment, the thermoplastic prepreg 100 heated by the heating device 13 is conveyed, by means of the conveyance device 12, into the mold 51, and shaping is performed on the thermoplastic prepreg 100 within the mold 51. After this, the resin material 91 is injected into the mold 51, and pressing is conducted while closing the mold 51 which has been open by a minute distance, whereby the molded article 80, including the thermoplastic prepreg 100, is molded. More specifically, when mold clamping is to be conducted, the movable die 54 is caused to stop slightly before the closing limit of the mold 51 (e.g., by 0.5 to 3 mm), and injection molding is performed. Pressing is conducted by causing the movable die 54 to advance again after the injection molding or halfway through the injection molding. In this way, by causing the molten resin material 91 to flow into the mold 51, with the mold 51 being open by a minute distance, it is possible to lower the resin pressure at which the resin material 91 is caused to flow. As a result, when the molten resin material 91 flows, the force with which the molten resin material 91 presses the thermoplastic prepreg 100 is weakened, so that it is possible to suppress deterioration in the strength of the molded article 80 and in the outward appearance thereof due to twisting, displacement, peeling, etc. of the thermoplastic prepreg 100. Above all, in the case where transparent resin is employed as the resin material 91, it is possible to attain a beautiful outward appearance with gloss and to obtain a product of high added value since there is no twisting, displacement, or peeling of the thermoplastic prepreg 100 as described above.

According to the present embodiment, the molten resin material 91 filling the interior of the mold 51 is pressed by the mold 51 after the filling, so that it is possible to form a thin and uniform stratified resin portion 90.

Further, according to the present embodiment, the shaping of the thermoplastic prepreg 100 is performed within the mold 51, so that, as compared with the case where a previously shaped preliminary molding is inserted into the mold 51, it is possible to achieve an improvement in terms of the productivity of the molded article 80.

Figure 5A:
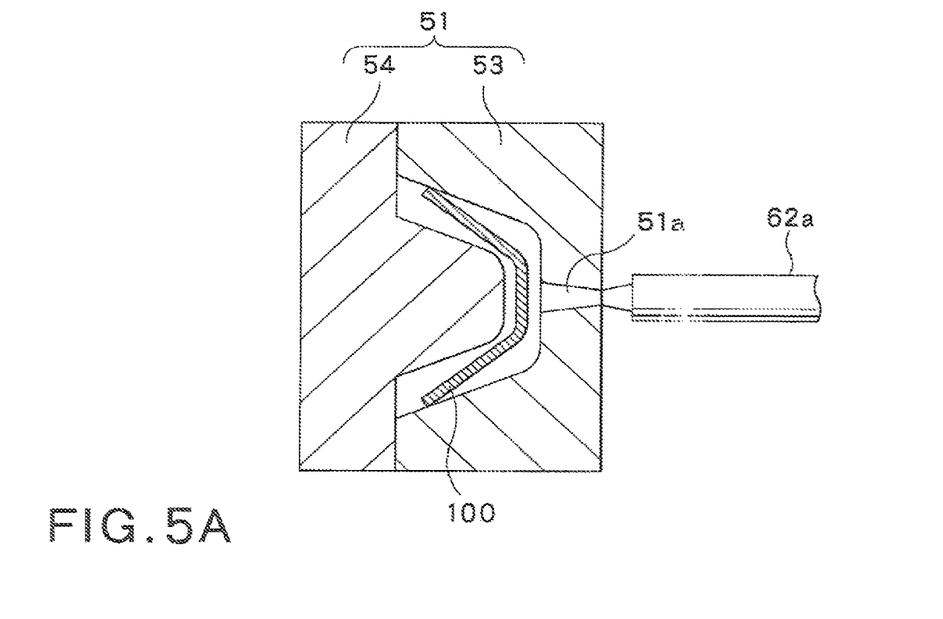
FIGS. 5A through 5B are schematic sectional views illustrating a molded article manufacturing method according to a comparative example.
Figure 5B:
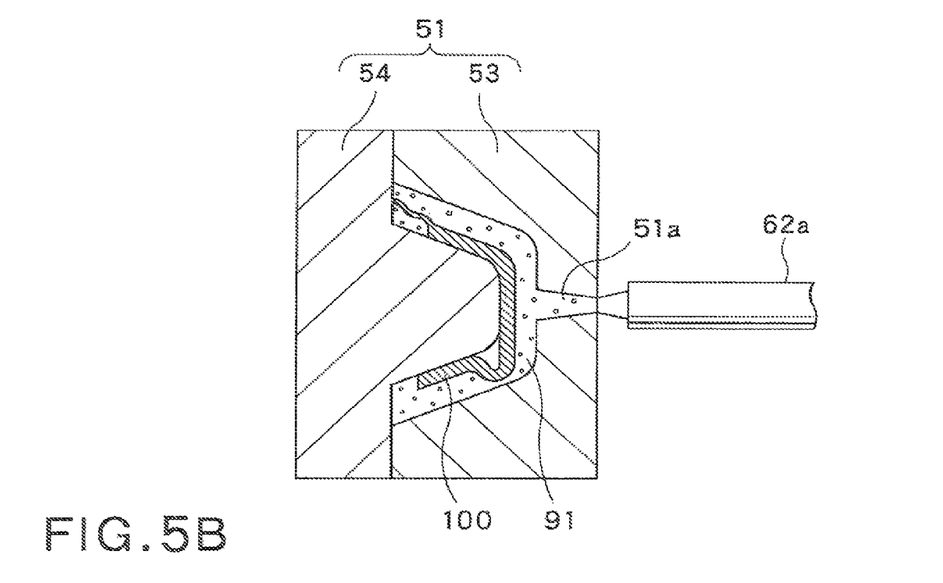

FIG. 5A shows a comparative example in which the resin material 91 is injected into the mold 51, with the movable die 54 and the stationary die 53 being completely held in close contact with each other; in this case, due to the rein pressure for causing the molten resin material 91 to flow, there is a fear of generation of twisting, displacement, peeling, etc. in the thermoplastic prepreg 100 (see FIG. 5B).

(Modification)

Figure 4A:
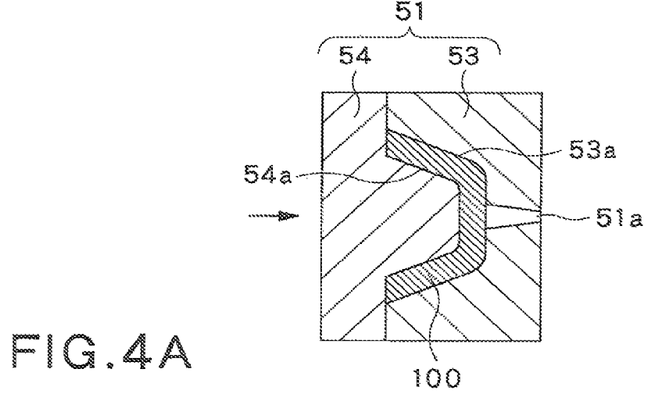
FIGS. 4A through 4C are schematic sectional views illustrating a molded article manufacturing method according to a modification.
Figure 4B:
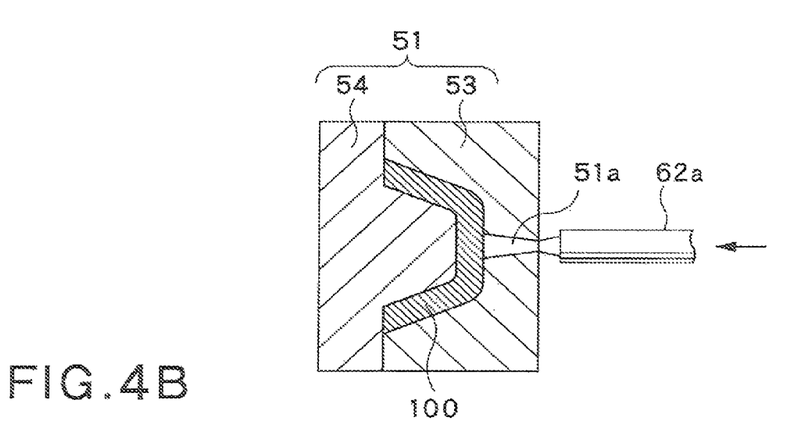
Figure 4C:
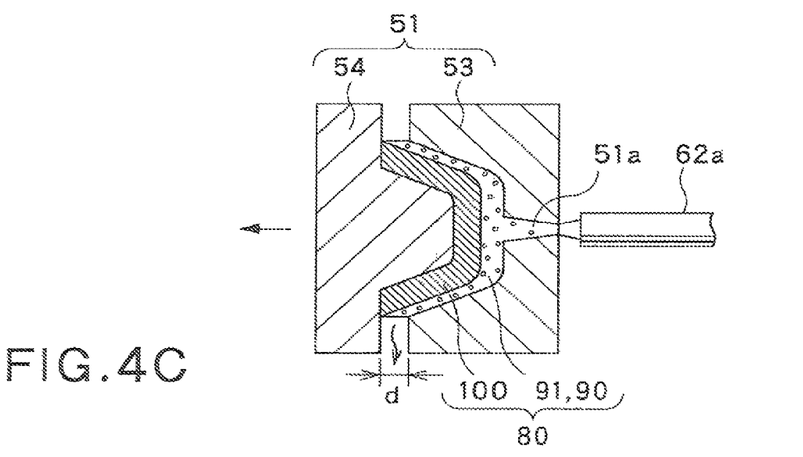

Next, a molded article manufacturing method according to a modification of the present embodiment will be described with reference to FIGS. 4A through 4C. In FIGS. 4A through 4C, the same components as those of the embodiment shown in FIGS. 1 through 3 are indicated by the same reference symbols, and a detailed description thereof will be left out. In the molded article manufacturing method described below, the molded article manufacturing apparatus 10 shown in FIG. 1 is employed.

As described above, in the case of FIGS. 3A through 3C, the resin material 91 is injected into the mold 51, and pressing is performed while closing the mold 51 which has been open by a minute distance, whereby the molded article 80 including the thermoplastic prepreg 100 is molded. This, however, should not be construed restrictively. For example, as shown in FIGS. 4A through 4C, core back molding may also be adopted.

In this case, as in the above case, the thermoplastic prepreg 100 heated by the heating device 13 is first conveyed into the mold 51 by the conveyance device 12.

Next, as shown in FIG. 4A, the movable die 54 is moved toward the stationary die 53 up to the closing limit of the mold 51, whereby the movable die 54 and the stationary die 53 are brought into close contact with each other. In this process, the heated thermoplastic prepreg 100 is pressed within the mold 51 by the mold 51 (the mold clamping device 52 on which the mold 51 is mounted), and undergoes shaping in conformity with the configuration of the cavities 53a and 54a.

Next, as shown in FIG. 4B, the housing 61 (see FIG. 1) is moved, and the injection nozzle 62a is connected to the gate 51a formed in the stationary die 53.

Subsequently, as shown in FIG. 4C, the mold 51 is opened to a minute degree. That is, the drive source 59 is controlled to drive the toggle mechanism 58, and the movable die 54 is moved away from the stationary die 53, with the movable die 54 being stopped at a position slightly spaced away from the closing limit of the mold 51. More specifically, the movable die 54 is stopped at a position where the distance d between the movable die 54 and the stationary die 53 is, for example, approximately 0.5 to 3 mm.

Simultaneously with the stopping of the movable die 54 or after the stopping of the movable die 54, the resin material 91 is injected into the mold 51. That is, the resin material 91 supplied into the cylinder 62 from the hopper 64 and melted is injected via the gate 51a of the mold 51. As a result, the resin material 91 is injected into the cavities 53a and 54a (i.e., between the stationary die 53 and the thermoplastic prepreg 100 mounted on the movable die 54), and the molten resin material 91 is supplied in conformity with the configuration of the cavities 53a and 54a.

In this process, the air that has existed within the cavities 53a and 54a beforehand is forced out by the resin material 91, whereby it is allowed to escape to the exterior via the gap between the movable die 54 and the stationary die 53. In this way, the air is allowed to escape via the gap between the movable die 54 and the stationary die 53, whereby the molten resin material 91 flows in a substantially fixed direction, and there is no fear of the resin material 91 flowing in a complicated manner within the cavities 53a and 54a. As a result, it is possible to prevent the thermoplastic prepreg 100 from being disturbed by the movement of the molten resin material 91, and to prevent generation of twisting, displacement, peeling, etc. in the thermoplastic prepreg 100.

In this way, the resin material 91 spreads substantially uniformly along the space defined between the stationary die 53 and the thermoplastic prepreg 100. As a result, the thermoplastic prepreg 100 and the resin material 91 that have been shaped into the configuration of the cavities 53a and 54a are integrated with each other.

Next, the thermoplastic prepreg 100 and the resin material 91 that have undergone shaping are cooled inside the mold 51, whereby there is molded the molded article 80 including the resin portion 90 corresponding to the resin material 91 and the thermoplastic prepreg 100 integrated with the resin portion 90. Next, the movable die 54 is moved to place the mold 51 in the open state, and the molded article 80 is extracted from the mold 51 thanks to a protruding pin (not shown) provided on the stationary die 53 or the movable die 54.

From this onward, similar processes are repeated. Through the repetition of these processes, a plurality of molded articles 80 are manufactured successively.

As described above, according to the present modification, the thermoplastic prepreg 100 heated by the heating device 13 is conveyed into the mold 51 by the conveyance device 12, and shaping is performed on the thermoplastic prepreg 100 within the mold 51. After this, the mold 51 is opened to a minute degree, and the resin material 91 is injected into the mold 51, whereby there is molded the molded article 80 including the thermoplastic prepreg 100. In this way, the molten resin material 91 is caused to flow into the mold 51, with the mold 51 being open by a minute distance, whereby it is possible to lower the resin pressure at which the resin material 91 flows. This helps to suppress deterioration in the strength and the outward appearance of the molded article 80 due to twisting, displacement, peeling, etc. of the thermoplastic prepreg 100. Apart from this, it is possible to attain similar effect as that of the embodiment shown in FIGS. 3A through 3C.

Further, according to the present modification, the heated thermoplastic prepreg 100 is pressed by the mold 51, and the thermoplastic prepreg 100 is shaped into a desired configuration. Further, due to the core back operation of the mold 51 performed afterwards, it is possible to secure the flow path for flowing the resin material 91. This helps to stabilize the flow of the resin material 91. Further, by pressing the thermoplastic prepreg 100 by the mold 51, the surface layer of the thermoplastic prepreg 100 is slightly cooled, and the viscosity of this surface layer is enhanced. As a result, when the resin pressure for causing the resin material 91 to flow is applied, it is possible to make it difficult to generate failure such as twisting, displacement, or peeling.

In the above embodiment and the above modification, the drive source 59 and the toggle mechanism 58 are an example of the first driving portion which performs shaping on the thermoplastic prepreg 100 within the mold 51 by moving the movable die 54 mounted on the mold clamping device 52. Further, in the above embodiment and the above modification, the drive source 59 and the toggle mechanism 58 are an example of the second driving portion which moves the movable die 54 by a minute distance. Further, the components of the first driving portion may be the same as the components of the second driving portion. That is, the first driving portion and the second driving portion may be identical with each other.

The molded article manufacturing method according to the above embodiment and the above modification is not restricted to injection molding method. For example, it may be some other plastic molding method (molded article manufacturing method or molding method) such as the transfer molding method (molded article manufacturing method or molding method).

It is also possible to combine, as needed, the plurality of components disclosed in connection with the above embodiment and the above modification with each other. Alternatively, some components may be excluded from the components disclosed in connection with the above embodiment and the above modification.

The invention claimed is:

1. A molded article manufacturing apparatus comprising:
   a storage portion;
   a heating device comprising vertical heating portions configured to heat an insert member;
   a conveyance device comprising:
      a conveyance mechanism configured to convey the insert member, and
      one or more chucks;
   a cooling device configured to cool the one or more chucks;
   an opening and closing device on which a mold, including a stationary die and a movable die, is mounted; and
   an injection device configured to inject a molding material into the mold,
   wherein the opening and closing device includes:
      a stationary platen configured to support the stationary die,
      a movable platen configured to support the movable die, and
      a driving portion configured to shape the insert member inside the mold by moving the movable die mounted on the movable platen,
   wherein the driving portion is configured to move the movable platen to a position where a distance between the movable die and the stationary die is 0.5 to 3 mm when the injection device injects the molding material into the mold, and
   wherein the conveyance device is configured to convey the insert member from the storage position to the heating device, then to the opening and closing device.

2. A molded article manufacturing apparatus according to claim 1, further comprising a storage portion which stores a plurality of insert members.

3. A molded article manufacturing apparatus according to claim 2, wherein the storage portion stores the insert members in a horizontal attitude and allows a change from the horizontal attitude to a vertical attitude.

4. A molded article manufacturing apparatus according to claim 1, wherein the heating device comprises a pair of heating portions which can heat the insert member and are opposite each other at an interval.

5. A molded article manufacturing apparatus according to claim 1, wherein the insert member is a thermoplastic prepreg.

* * * * *